US012693379B2

(12) United States Patent
Jiang et al.

(10) Patent No.: US 12,693,379 B2
(45) Date of Patent: Jul. 28, 2026

(54) METHOD AND APPARATUS FOR CALIBRATING INSTALLATION ERROR IN PITCH ANGLE OF TRAFFIC RADAR, AND STORAGE MEDIUM

(71) Applicant: ZHEJIANG UNIVIEW TECHNOLOGIES CO., LTD., Hangzhou (CN)

(72) Inventors: Ning Jiang, Zhejiang (CN); Ningning Cao, Zhejiang (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 281 days.

(21) Appl. No.: 18/685,670

(22) PCT Filed: Jun. 29, 2022

(86) PCT No.: PCT/CN2022/102113
§ 371 (c)(1),
(2) Date: Feb. 22, 2024

(87) PCT Pub. No.: WO2023/024693
PCT Pub. Date: Mar. 2, 2023

(65) Prior Publication Data
US 2025/0130313 A1 Apr. 24, 2025

(30) Foreign Application Priority Data
Aug. 24, 2021 (CN) .......................... 202110977354.1

(51) Int. Cl.
*G01S 7/40* (2006.01)
*G01S 13/91* (2006.01)

(52) U.S. Cl.
CPC ............ *G01S 7/4034* (2021.05); *G01S 13/91* (2013.01)

(58) Field of Classification Search
CPC ...... G01S 7/4034; G01S 13/91; G01S 7/4082; G01S 13/931; G01S 7/03; G01S 7/403;
(Continued)

(56) References Cited

U.S. PATENT DOCUMENTS

| | | | |
|---|---|---|---|
| 5,371,503 A | 12/1994 | Bower | |
| 7,061,424 B2 * | 6/2006 | Kuroda | ................. G01S 7/4026 |
| | | | 342/195 |

(Continued)

FOREIGN PATENT DOCUMENTS

| | | |
|---|---|---|
| CN | 104391280 A | 3/2015 |
| CN | 105005040 A | 10/2015 |

(Continued)

OTHER PUBLICATIONS

KR_20160125667_A_I_translate.pdf (Year: 2016).*
(Continued)

*Primary Examiner* — Yonghong Li
(74) *Attorney, Agent, or Firm* — MASCHOFF BRENNAN

(57) ABSTRACT

Provided are a method and apparatus for calibrating an installation error in a pitch angle of a traffic radar, and a storage medium. The method includes changing the frequency of a traffic radar according to a preset strategy within a preset frequency range; acquiring energy values of echo signals of a preset target at different frequencies in sequence; and in response to determining that the acquired energy values of the echo signals satisfy a preset condition, determining the frequency corresponding to the maximum echo signal energy value as the operating frequency of the traffic radar to calibrate the installation error in the pitch angle of the traffic radar. The preset target is disposed on the ground.

14 Claims, 5 Drawing Sheets

(58) Field of Classification Search
CPC ......... G01S 7/4086; G01S 2013/93271; G01C 15/12; G01C 9/00; B60R 11/00; G06F 17/11
See application file for complete search history.

(56) References Cited

U.S. PATENT DOCUMENTS

| | | | |
|---|---|---|---|
| 9,470,784 B2 | 10/2016 | Kishigami et al. | |
| 10,126,410 B2 * | 11/2018 | Treptow | G01S 13/424 |
| 2014/0327567 A1 | 11/2014 | Kishigami et al. | |
| 2016/0259037 A1 * | 9/2016 | Molchanov | G06N 3/084 |

FOREIGN PATENT DOCUMENTS

| | | | | |
|---|---|---|---|---|
| CN | 105492921 | A | 4/2016 | |
| CN | 109358322 | A * | 2/2019 | G01S 7/4052 |
| CN | 110261832 | A | 9/2019 | |
| CN | 110376560 | A | 10/2019 | |
| CN | 111751796 | A * | 10/2020 | G01S 7/4026 |
| CN | 112147611 | A * | 12/2020 | G01S 13/87 |
| CN | 112166336 | A * | 1/2021 | G01S 7/40 |
| JP | 2861995 | B1 | 2/1999 | |
| KR | 20160125667 | A * | 11/2016 | B60Q 9/008 |

OTHER PUBLICATIONS

CN_112166336_A_I_translate.pdf (Year: 2021).*
CN_112147611_A_I_translate.pdf (Year: 2020).*
CN111751796A_Description_20251217_1148.pdf—translation of CN111751796A (Year: 2020).*
CN_109358322_A_I_translate.pdf (Year: 2019).*
Chinese Office Action for Application No. 202110977354.1, dated Jun. 25, 2025, 12 pages including translation.
Extended European Search Report for Application No. 22860040.9, dated Jul. 18, 2025, 14 pages.
Chen, Jiang, et al., "Ocean Surface Current Detection by HF Ground Wave Radar with Portable Antenna System", School of Electronic Information, J. Wuhan University (Nat. Sci. Ed.), vol. 51 No. 1, Feb. 2005, 105-108, Wuhan 430072, Hubei, China.
Chinese Office Action for Application No. 202110977354.1, dated Dec. 9, 2025, 13 pages including translation.
International Search Report in Application No. PCT/CN2022/102113, dated Sep. 2, 2022, 4 pages, including translation.

* cited by examiner

METHOD AND APPARATUS FOR CALIBRATING INSTALLATION ERROR IN PITCH ANGLE OF TRAFFIC RADAR, AND STORAGE MEDIUM

CROSS REFERENCE TO RELATED APPLICATIONS

This is a National Stage Application, filed under 35 U.S.C. 371, of International Patent Application No. PCT/CN2022/102113, filed on Jun. 29, 2022, which is based on and claims priority to Chinese Patent Application No. 202110977354.1 filed with the China National Intellectual Property Administration (CNIPA) on Aug. 24, 2021, the disclosure of which is incorporated herein by reference in its entirety.

TECHNICAL FIELD

The present application relates to the technical field of traffic radar communication, for example, a method and apparatus for calibrating an installation error in a pitch angle of a traffic radar and apparatus, and a storage medium.

BACKGROUND

The conventional video is easily affected by environmental factors such as strong light, rain, and snow, which greatly limit the application of the conventional video in the field of intelligent transportation. The millimeter wave traffic radar plays an irreplaceable role in the intelligent transportation system due to characteristics such as the long detection distance, the high speed measurement accuracy, and less affected by weather conditions.

In practical applications, the traffic radar is generally mounted on an L-shaped pole at the roadside. The height of the pole is about 6 meter (m) to 8 m. The normal direction of the conventional traffic radar is designed to be the direction with the strongest antenna gain. To ensure the road coverage range, the traffic radar is mounted on the pole at a certain downtilt angle. However, the deviation of the installation pitch angle of the traffic radar has a great impact on the target detection coverage range and long-range target capture rate of the traffic radar. According to the current application requirements of the millimeter wave traffic radar in major scenarios such as urban roads and entrances and exits of viaduct or highway ramp entrances and exits, the detection range of the traffic radar for a target vehicle is required to cover 20 m to 230 m. It is assumed that the height of the L-shaped pole where the traffic radar is mounted is 8 m. In practical applications, the antenna gain is inversely proportional to the field angle of view (FOV) of the lens. To ensure the long-distance detection capability of the traffic radar, the FOV at 3 dB is designed to be ±3° (β1 in FIG. 1) in the antenna pitch direction, the FOV at 10 dB is designed to ±16° (β1 in FIG. 2) in the antenna pitch direction, and the installation pitch angle of the traffic radar is required to be tilted downward by 5° (β0 in FIGS. 1 and 2). Then the projection length of the central beam of the traffic radar in the horizontal direction of the ground is about 90 m, the antenna energy corresponding to 3 dB covers about 230 m in the horizontal direction of the ground, and the antenna energy corresponding to 10 dB covers a short distance of 20 m in the horizontal direction of the ground. If the traffic radar installation pitch angle deviates by 2° to become 7° downward, the projection length of the central beam of the traffic radar in the horizontal direction of the ground is about 65 m, and the antenna energy corresponding to 3 dB covers only 115 m in the horizontal direction of the ground, then the problem of the low long-distance target capture rate of the traffic radar is definitely caused, which has been verified in practical applications.

At present, the installation angle deviation problem in the traffic radar can be solved with the aid of electronic sensors. However, the traffic radar is quite different from the automobile radar. Since it is rare that the traffic radar installation angle changes due to bumps, collisions, and the like, there is no need to monitor the change of the installation angle of the traffic radar in real time. Moreover, the closed-loop control system including the combination of sensor, electric motor and controller inevitably causes high equipment costs and a large size.

With the aid of the specific target or peripheral environment, a software algorithm is used to calculate the installation deviation angle of the traffic radar, and the solution in which the deviation angle is used as a software compensation parameter for an angle detection result of the traffic radar. The angle measurement error is compensated, but the antenna beam direction of the traffic radar cannot be changed, and the problem of the pitch direction angle installation deviation affecting the detection range and capture rate of the traffic radar cannot be solved.

SUMMARY

The present application provides a method and apparatus for calibrating an installation error in a pitch angle of a traffic radar, and a storage medium, so as to not only calibrate the installation error in the pitch angle of the traffic radar at a lower cost, but also prevent the pitch angle installation error from affecting the detection range and capture rate of the traffic radar.

An embodiment of the present application provides a method for calibrating an installation error in a pitch angle of a traffic radar. The method includes the steps described below.

The frequency of a traffic radar is changed according to a preset strategy within a preset frequency range.

Energy values of echo signals of a preset target at different frequencies are acquired in sequence.

In response to determining that the acquired energy values of the echo signals satisfy a preset condition, the frequency corresponding to the maximum echo signal energy value is determined as the operating frequency of the traffic radar so as to calibrate the installation error in the pitch angle of the traffic radar.

The preset target is disposed on the ground, and in a horizontal direction of the ground, the distance between the preset target and a projection point of the traffic radar in the horizontal direction is the length of a projection of a central beam of the traffic radar in the horizontal direction when the traffic radar is mounted at an expected pitch angle.

An embodiment of the present application provides an apparatus for calibrating an installation error in a pitch angle of a traffic radar. The apparatus includes a frequency changing module, an echo signal energy value acquisition module, and an operating frequency determination module.

The frequency changing module is configured to change the frequency of a traffic radar according to a preset strategy within a preset frequency range.

The echo signal energy value acquisition module is configured to acquire energy values of echo signals of a preset target at different frequencies in sequence; where the preset target is disposed on the ground, and in a horizontal direction of the ground, the distance between the preset target and a projection point of the traffic radar in the horizontal direction is the length of a projection of a central beam of the traffic radar in the horizontal direction when the traffic radar is mounted at an expected pitch angle.

The operating frequency determination module is configured to, in response to determining that the acquired energy values of echo signals satisfy a preset condition, determine the frequency corresponding to the maximum echo signal energy value as the operating frequency of the traffic radar to calibrate the installation error in the pitch angle of the traffic radar.

A computer-readable storage medium provided by an embodiment of the present application is configured to store a computer program for performing the method for calibrating an installation error in a pitch angle of a traffic radar described above when the computer program is executed by a processor.

BRIEF DESCRIPTION OF DRAWINGS

The drawings are provided for a further understanding of the technical solutions of the present application and constitute a part of the description. The drawings and the embodiments of the present application are used to explain the technical solutions of the present application and not intended to limit the technical solutions of the present application.

DETAILED DESCRIPTION

Figure 1:
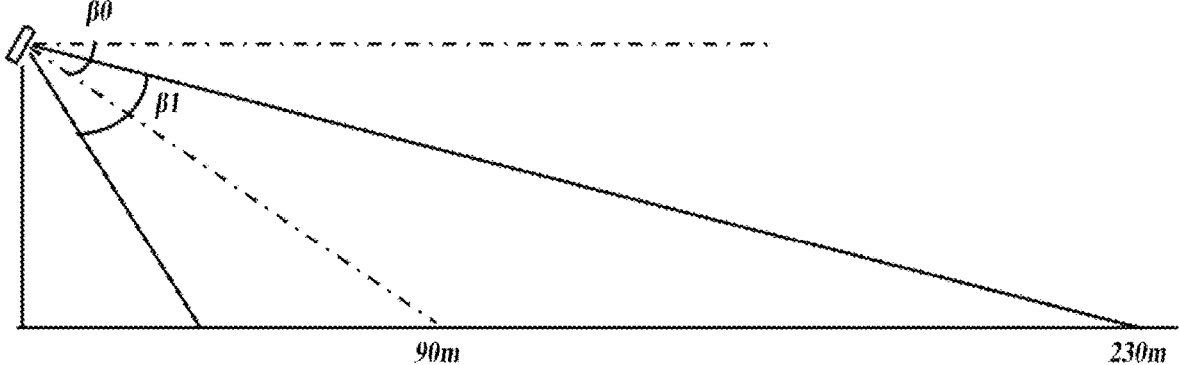
FIG. 1 is a schematic diagram illustrating the coverage range of an antenna having the gain of 3 dB in the pitch direction in the related art.
Figure 2:
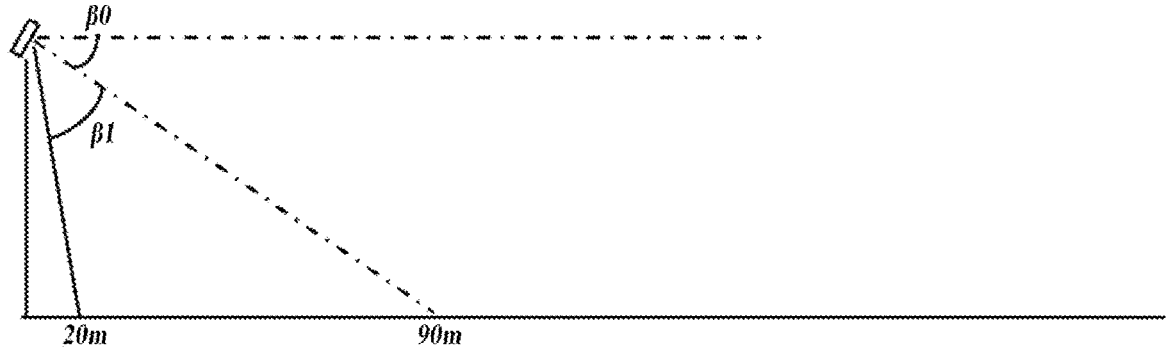
FIG. 2 is a schematic diagram illustrating the coverage range of an antenna having the gain of 10 dB in the pitch direction in the related art.
Figure 3:
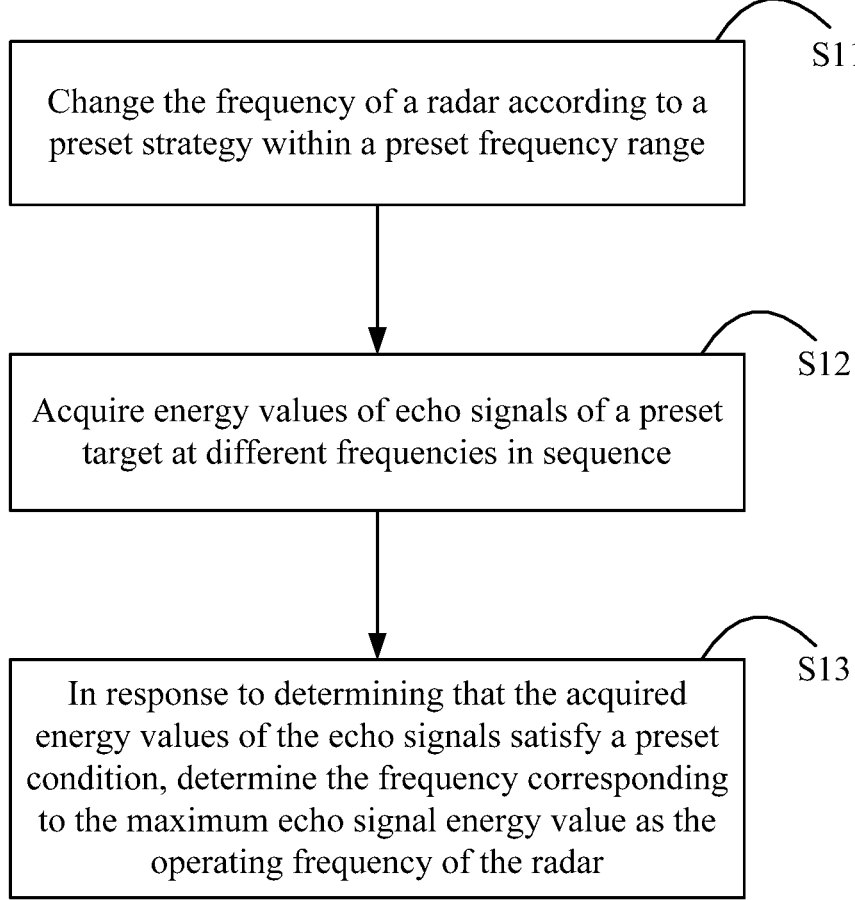
FIG. 3 is a schematic diagram of a method for calibrating an installation error in a pitch angle of a traffic radar according to an embodiment of the present application.

FIG. 3 is a flowchart of a method for calibrating an installation error in a pitch angle of a traffic radar according to an embodiment of the present application. As shown in FIG. 3, a method for calibrating an installation error in a pitch angle of a traffic radar in this embodiment includes steps S11 to S13.

In S11, the frequency of a traffic radar is changed according to a preset strategy within a preset frequency range.

In S12, energy values of echo signals of a preset target at different frequencies are acquired in sequence.

In S13, in response to determining that the acquired energy values of the echo signals satisfy a preset condition, the frequency corresponding to the maximum echo signal energy value is determined as the operating frequency of the traffic radar.

In an example embodiment, before the frequency of the traffic radar is changed, the traffic radar is mounted at a preset downtilt angle, which cannot exceed the designed maximum calibration angle. If the preset downtilt angle exceeds the designed maximum calibration angle, calibration cannot be performed. For example, with the aid of a rough angle measurement tool, the downtilt angle is measured to be 5°.

In an example embodiment, the preset strategy includes changing the frequency from small to large or from large to small by same or different preset step frequencies each time. The step frequency may be set based on experience, not only to ensure the calibration accuracy, but also to consider the calibration time. The step frequency for each frequency change may be the same or different and may be adjusted as needed.

In an example embodiment, the preset target is disposed on the ground, and in a horizontal direction of the ground, the distance between the preset target and a projection point of the traffic radar in the horizontal direction is the length of a projection of a central beam of the traffic radar in an horizontal direction when the traffic radar is mounted at an expected pitch angle. The preset target may be a corner reflector or another strongly reflective target. No other strongly reflective targets exist around the preset target, so as to avoid affecting the calibration process.

In an example embodiment, the expected pitch angle is determined according to the installation height and the preset detection range of the traffic radar. The expected pitch angle is the pitch angle at which the traffic radar is mounted in case where the pitch angle at which the traffic radar is mounted is consistent with a preset pitch angle without an error.

In an example embodiment, the preset condition includes the acquired energy values of the echo signals changing from small to large and then from large to small.

In an example embodiment, the preset frequency range is determined according to the preset maximum calibration angle and the preset minimum calibration angle of the traffic radar.

The preset maximum calibration angle is a positive angle value, and the preset minimum calibration angle is a negative angle value. The absolute values of the preset maximum calibration angle and the preset minimum calibration angle may be the same or different.

In an example embodiment, the step of determining the preset frequency range according to the preset maximum calibration angle and the preset minimum calibration angle of the traffic radar includes the steps described below.

A first wavelength when the preset maximum calibration angle is calculated is determined according to a preset equation and a first frequency value is determined according to the first wavelength.

A second wavelength when the preset minimum calibration angle is calculated is determined according to the preset equation and a second frequency value is determined according to the second wavelength.

The preset frequency range is a range from the first frequency value to the second frequency value, and the preset frequency range includes the first frequency value and the second frequency value.

In an example embodiment, determining the frequency according to the wavelength may be performed in the manner of calculation or verification through experiments.

In an example embodiment, the preset equation is described below.

$$\theta = \arcsin\left(\frac{\lambda}{\lambda_g} - \frac{\lambda}{L_f + L_P}\right).$$

$\theta$ denotes the preset maximum calibration angle or the preset minimum calibration angle, $L_f + L_P$ denotes the distance between oscillators of two adjacent radiating unit of an antenna of the traffic radar, $\lambda$ denotes the wavelength of a millimeter wave in the air, and $\lambda_g$ denotes the wavelength of the millimeter wave on a dielectric substrate.

In the embodiment of the present application, the direction of the maximum gain of the antenna beam in the pitch direction of the antenna is changed by adjusting the operating frequency of the antenna (the operating frequency of the traffic radar), and the installation error in the pitch direction of the traffic radar is compensated, so as to prevent the installation error in the pitch direction of the traffic radar from affecting the target detection range and capture rate and save costs.

Figure 4:
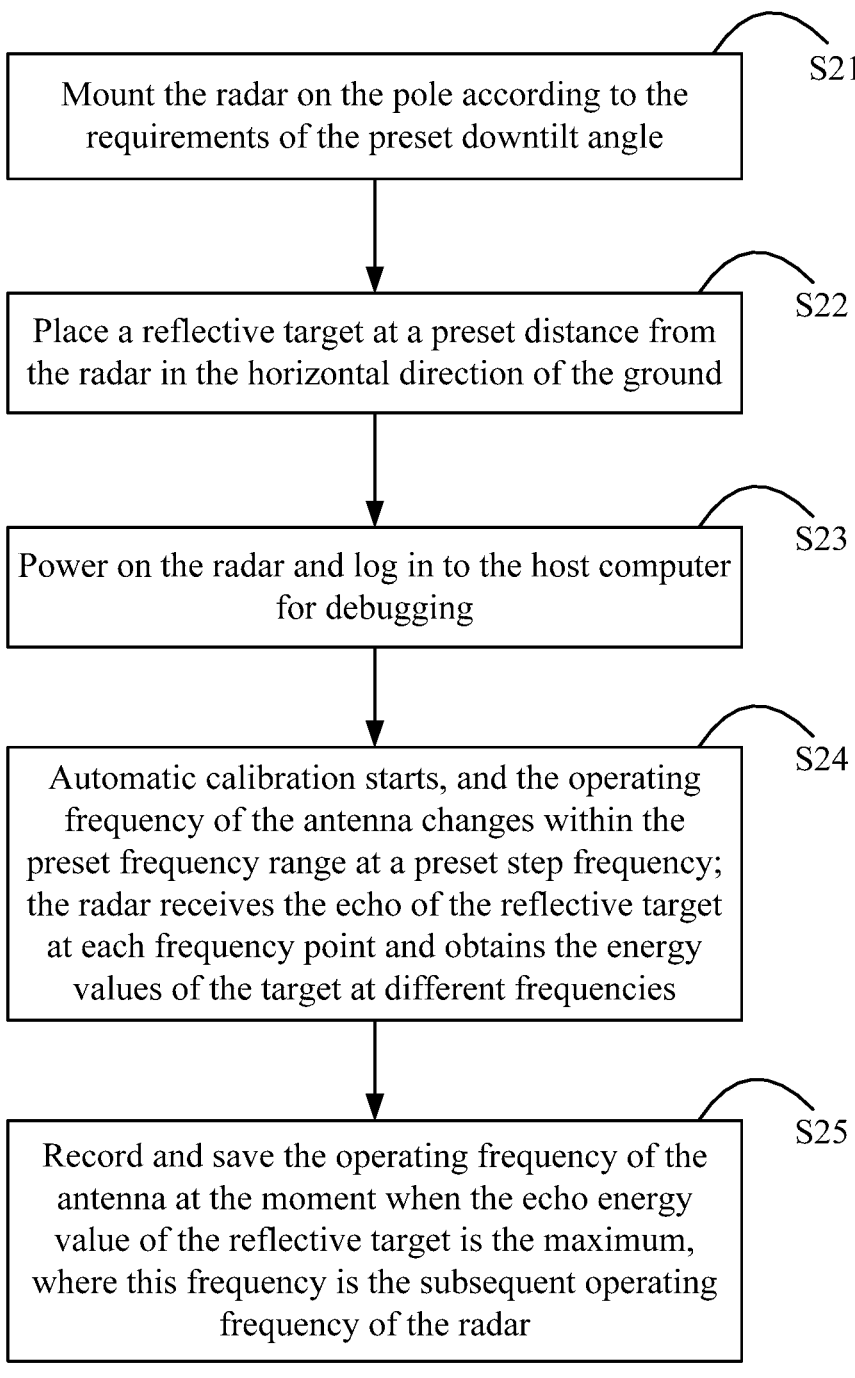
FIG. 4 is a flowchart of a method for calibrating an installation error in a pitch angle of a traffic radar according to an embodiment of the present application.

FIG. 4 is a flowchart of a method for calibrating an installation error in a pitch angle of a traffic radar according to an embodiment of the present application. As shown in FIG. 4, the method includes steps S21 to S25.

In S21, the traffic radar is mounted on the pole according to the requirements of the preset downtilt angle.

In S22, a reflective target is placed at a preset distance from the traffic radar in the horizontal direction of the ground.

In S23, the traffic radar is powered on and the host computer is logged in for debugging.

In S24, automatic calibration starts, and the operating frequency of the antenna changes within the preset frequency range at a preset step frequency; the traffic radar receives the echo of the reflective target at each frequency point and obtains the energy values of the target at different frequencies.

In S25, the operating frequency of the antenna at the moment when the echo energy value of the reflective target is the maximum is recorded and saved, and this frequency is the subsequent operating frequency of the traffic radar.

In step S21, a rough manual determination method may be used to determine the downtilt angle. For example, a mobile phone is backed against the front panel of the traffic radar, and level software is used to make a simple determination.

The detection distance required by the millimeter wave traffic radar is relatively long (e.g. more than 200 m). Therefore, in actual situations, the downtilt angle required for the installation of the traffic radar is also relatively small and is generally within the range from 3° to 8° (which is related to the detection distance, the height of the L-shaped pole, the uphill slope of the road, the downhill slope of the road, and the like). In the field of traffic radar applications, the traffic radar has a calibration angle of ±3° to satisfy actual application requirements. The large calibration angle corresponds to the wide operating frequency of the antenna. However, according to the electromagnetic wave theory, the operating frequency of the antenna is significantly different from the central frequency, causing antenna beam broadening, distortion, and even beam fission. Therefore, when a designer determines the calibration angle, the designer needs to consider the actual antenna dimensions and the actual application scenarios of the product, and it is recommended that the maximum calibration angle does not exceed the range of ±10°.

For example, the calibration angle required by the design requirement is ±3°. After the antenna dimensions are determined, the value of Lf+Lp (Lf+Lp denotes the distance between oscillators of two adjacent radiating unit of the antenna of the traffic radar) is also determined. According to the relationship between an antenna radiation direction angle and the operating frequency of the antenna, it can be seen that by changing the operating frequency of the antenna, the ratio of $\lambda$ to $\lambda_g$ can be changed and an antenna beam pointing angle can be changed.

The relationship between the antenna radiation direction angle and the operating frequency of the antenna is $$\theta = \arcsin\left(\frac{\lambda}{\lambda_g} - \frac{\lambda}{L_f + L_P}\right),$$

$\lambda$ denotes the wavelength of the millimeter wave in the air, and $\lambda_g$ denotes the wavelength of the millimeter wave on the dielectric substrate.

After an antenna printed circuit board (PCB) is produced, the traffic radar system needs to be tested for a direction pattern and the pointing angles of the main lobe of the traffic radar at different frequencies are tested. It is assumed that during the antenna design simulation process, the frequency of 77 GHz is designed to be the central operating frequency of the antenna, that is, the main lobe of the antenna at this frequency points to the normal direction of the traffic radar. The pointing angle of the main lobe of the traffic radar at each frequency within the range from 76 GHz to 78 GHz (the working range of radio frequency chips of the traditional millimeter wave traffic radar may be between 76 GHz and 81 GHz, such as TI XWR1XXX series chips) is tested. The range of the operating frequency of the antenna that satisfies the calibration angle of ±3° is selected according to the test result. For example, finally, the traffic radar works within the range from 77 GHZ–F1 to 77 GHz+F2. The values of F1 and F2 may be different or the same.

Figure 5:
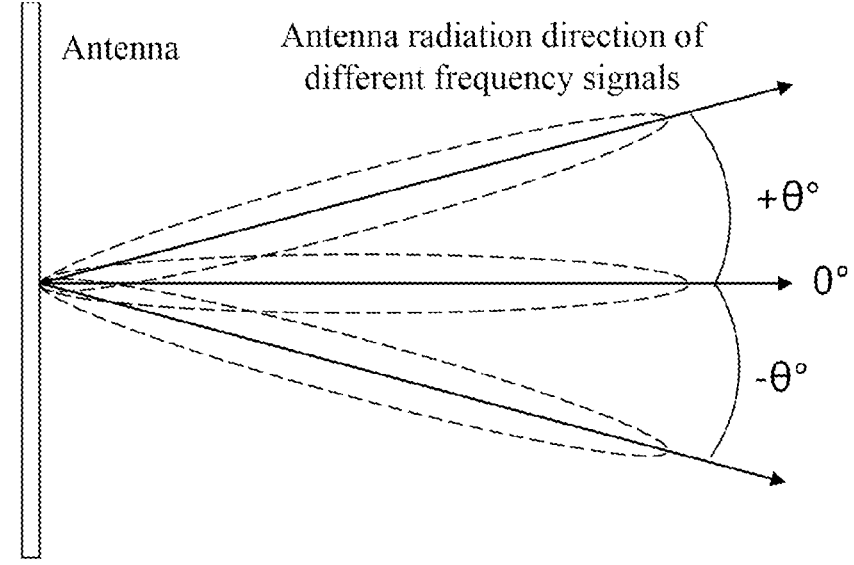
FIG. 5 is a schematic diagram of the beam direction in the pitch direction of the antenna at different frequencies in the related art.

The operating frequency of the antenna is adjusted to change within the range from 77 GHz–F1 to 77 GHz+F2. The direction of the maximum gain beam in the pitch direction of the antenna is based on 0° (the 77 GHz normal direction) and changes within the range from −θ to +θ as shown in FIG. 5. +θ denotes the maximum calibration angle in the present application, and −θ denotes the minimum calibration angle in the present application. If the actual installation error of the traffic radar exceeds this range, this method cannot be used for calibration.

In step S22, the preset distance is determined according to the installation height, the downtilt angle, and the operating frequency of the traffic radar. For example, if the height of the pole is 8 m, the downtilt angle is 5° (without an error), and the distance between the normal position of the antenna and the horizontal direction of the ground at the frequency of 77 GHz is 90 m, then the preset distance is configured to be 90 m at this time. The reflective target may be a corner reflector or another strong-energy reflective target.

In step S23, it needs to ensure that no other strongly reflective targets exist within a range of the ground 90 meter as straight-line distance from the traffic radar in an area that the traffic radar detects, so as to avoid affecting the calibration process.

In step S24, for example, the operating frequency of the antenna (that is, the operating frequency of the traffic radar) changes within the range from 77 G−F1 to 77 G+F2 with ΔF as the step frequency, and the traffic radar receives the echo of the target at a distance of 90 m at each frequency point and obtains the energy values of the target at different frequencies. The step frequency ΔF needs to be selected appropriately, not only to ensure the calibration accuracy, but also to consider the calibration time.

Figure 6:
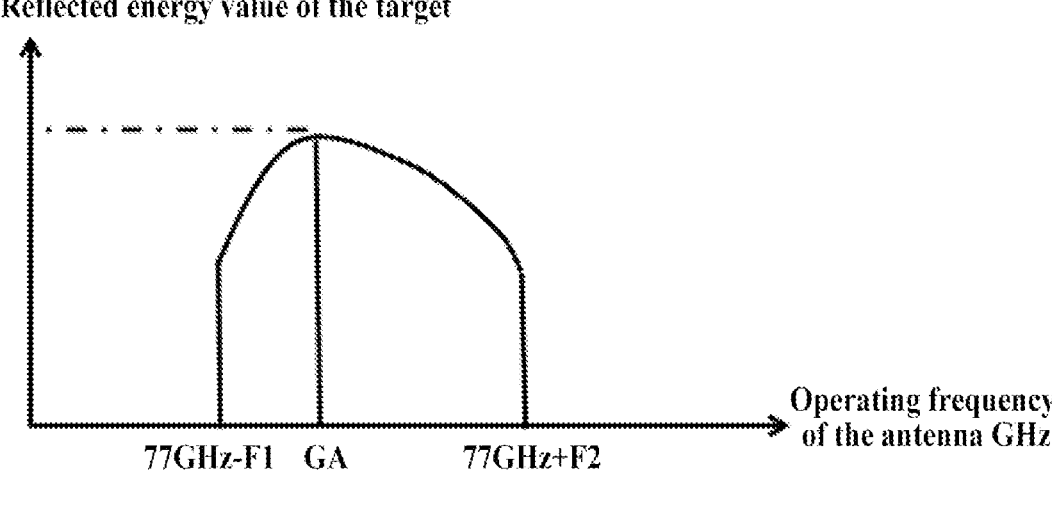
FIG. 6 is a schematic diagram showing the variation trend of the target energy value with the antenna frequency during a calibration process according to an embodiment of the present application.

In step S25, the operating frequency of the antenna at the moment when the echo energy value of the reflective target is the maximum is shown by the GA point in FIG. 6. If the installation error of the traffic radar is within the range of ±θ, the target energy value acquired in this step changes according to the trend of small-large-small (as shown in FIG. 6).

In the embodiment of the present application, the direction of the maximum gain of the antenna beam in the pitch direction of the antenna is changed by adjusting the operating frequency of the antenna, and the installation error in the pitch direction of the traffic radar is compensated, so as to prevent the installation error in the pitch direction of the traffic radar from affecting the target detection range and capture rate and save costs.

Figure 7:
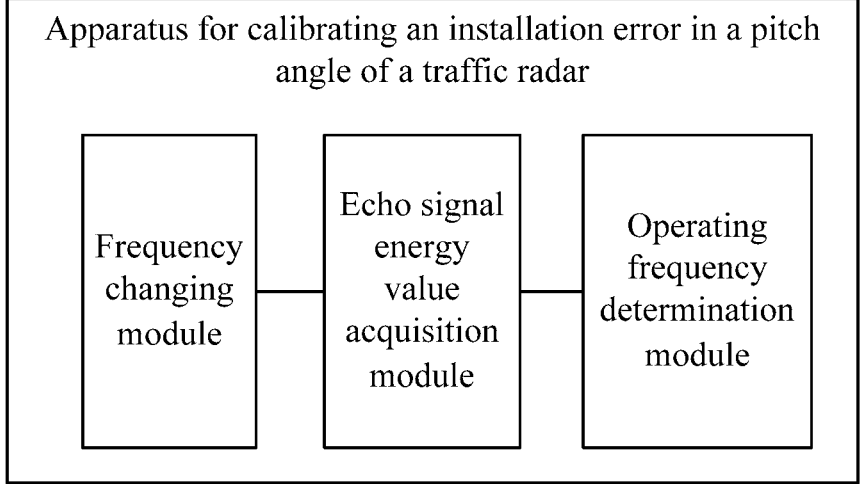
FIG. 7 is a schematic diagram of an apparatus for calibrating an installation error in a pitch angle of a traffic radar according to an embodiment of the present application.

FIG. 7 is a schematic diagram of an apparatus for calibrating an installation error in a pitch angle of a traffic radar according to an embodiment of the present application. As shown in FIG. 7, the apparatus for calibrating an installation error in a pitch angle of a traffic radar in this embodiment includes a frequency changing module, an echo signal energy value acquisition module, and an operating frequency determination module.

The frequency changing module is configured to change the frequency of a traffic radar according to a preset strategy within a preset frequency range.

The echo signal energy value acquisition module is configured to acquire energy values of echo signals of a preset target at different frequencies in sequence; where the preset target is disposed on the ground, and in a horizontal direction of the ground, the distance between the preset target and a projection point of the traffic radar in the horizontal direction is the length of a projection of a central beam of the traffic radar in the horizontal direction when the traffic radar is mounted at an expected pitch angle.

The operating frequency determination module is configured to, in response to determining that the energy values of the echo signals acquired in the method for calibrating an installation error in a pitch angle of a traffic radar satisfy a preset condition, determine the frequency corresponding to the maximum echo signal energy value as the operating frequency of the traffic radar to calibrate the installation error in the pitch angle of the traffic radar.

In an example embodiment, the preset strategy includes changing the frequency from small to large or from large to small by same or different preset step frequencies each time.

In the embodiment of the present application, the direction of the maximum gain of the antenna beam in the pitch direction of the antenna is changed by adjusting the operating frequency of the antenna, and the installation error in the pitch direction of the traffic radar is compensated, so as to prevent the installation error in the pitch direction of the traffic radar from affecting the target detection range and capture rate and save costs.

A computer-readable storage medium provided by an embodiment of the present application is configured to store a computer program for performing the method for calibrating an installation error in a pitch angle of a traffic radar described above when the computer program is executed by a processor. The computer-readable storage medium may be a non-transitory computer-readable storage medium.

The present application describes multiple embodiments, and the description is exemplary rather than restrictive. There may be more embodiments and implementations within the scope of the embodiments described in the present application. Although many possible combinations of features are shown in the drawings and discussed in the detailed description, many other combinations of the disclosed features are possible. Unless expressly limited, any feature or element of any embodiment may be used in conjunction with, or may be substituted for, any other feature or element of any other embodiment.

It is to be understood by those of ordinary skill in the art that functional modules/units in all or part of the steps of the method, the system, and the apparatus disclosed above may be implemented as software, firmware, hardware, and an appropriate combination thereof. In the hardware embodiment, the division of the functional modules/units mentioned in the preceding description may not necessarily correspond to the division of physical assemblies. For example, one physical assembly may have multiple functions, or one function or step may be implemented jointly by several physical assemblies. Some or all assemblies may be implemented as software executed by processors such as digital signal processors or microcontrollers, hardware, or integrated circuits such as application-specific integrated circuits. Such software may be distributed on a computer-readable medium, which may include a computer storage medium (or a non-transitory medium) and a communication medium (or a transitory medium). As is known to those of ordinary skill in the art, the term, computer storage medium, includes volatile and nonvolatile, removable and non-removable media implemented in any method or technology for storing information (such as computer-readable instructions, data structures, program modules, or other data). The computer storage medium includes, but is not limited to, a random-access memory (RAM), a read-only memory (ROM), an electrically erasable programmable read-only memory (EEPROM), a flash memory or other memory technologies, a compact disc-read-only memory (CD-ROM), a digital versatile disc (DVD) or other optical disc storage, a magnetic cassette, a magnetic tape, magnetic disk storage or other magnetic storage apparatuses, or any other medium used for storing desired information and accessed by a computer. In addition, as is known to those of ordinary skill in the art, the communication medium generally includes computer-readable instructions, data structures, program modules, or other data in modulated data signals such as carriers or other transmission mechanisms and may include any information delivery medium.

What is claimed is:

1. A method for calibrating an installation error in a pitch angle of a traffic radar, comprising:
   changing frequency of the traffic radar according to a preset strategy within a preset frequency range;
   acquiring energy values of echo signals of a preset target at different frequencies in sequence; and
   in response to determining that the acquired energy values of the echo signals satisfy a preset condition, determining frequency corresponding to a maximum energy value of the echo signals as operating frequency of the traffic radar to calibrate the installation error in the pitch angle of the traffic radar;
   wherein the preset target is disposed on the ground, and in a horizontal direction of the ground, a distance between the preset target and a projection point of the traffic radar in the horizontal direction is a length of a projection of a central beam of the traffic radar in the horizontal direction when the traffic radar is mounted at an expected pitch angle;

wherein the preset frequency range is determined according to a preset maximum calibration angle and a preset minimum calibration angle of the traffic radar;

wherein determining the preset frequency range according to the preset maximum calibration angle and the preset minimum calibration angle of the traffic radar comprises:

determining a first wavelength when the preset maximum calibration angle is calculated according to a preset equation and determining a first frequency value according to the first wavelength; and determining a second wavelength when the preset minimum calibration angle is calculated according to the preset equation and determining a second frequency value according to the second wavelength;

wherein the preset frequency range is a range from the first frequency value to the second frequency value, and the preset frequency range comprises the first frequency value and the second frequency value;

the preset equation is as follows:

$$\theta = \arcsin\left(\frac{\lambda}{\lambda_g} - \frac{\lambda}{L_f + L_P}\right),$$

wherein $\theta$ denotes the preset maximum calibration angle or the preset minimum calibration angle, $L_f + L_p$ denotes a distance between oscillators of two adjacent radiating units of an antenna of the traffic radar, $L_f$ denotes a feed line length between the two adjacent radiating units of the antenna of the traffic radar, $L_p$ denotes a patch element length of a radiating unit of the antenna of the traffic radar, $\lambda$ denotes a wavelength of a millimeter wave of the traffic radar in air, and $\lambda_g$ denotes a wavelength of the millimeter wave of the traffic radar on a dielectric substrate.

2. The method of claim 1, wherein the preset strategy comprises changing the frequency from small to large or from large to small by same or different preset step frequencies each time.

3. The method of claim 1, wherein the expected pitch angle is determined according to an installation height and a preset detection range of the traffic radar.

4. The method of claim 1, wherein the preset condition comprises the acquired energy values of the echo signals changing from small to large and then from large to small.

5. The method of claim 1, wherein the traffic radar is mounted at a preset downtilt angle before the frequency of the traffic radar is changed, the preset downtilt angle not exceeds a designed maximum calibration angle.

6. The method of claim 5, wherein the downtilt angle is equal to 5°.

7. The method of claim 1, wherein the preset maximum calibration angle is a positive angle value, the preset minimum calibration angle is a negative angle value, and the absolute values of the preset maximum calibration angle and the preset minimum calibration angle are the same.

8. The method of claim 1, wherein the preset maximum calibration angle is a positive angle value, the preset minimum calibration angle is a negative angle value, and the absolute values of the preset maximum calibration angle and the preset minimum calibration angle are different.

9. A non-transitory computer-readable storage medium, which is configured to store a computer program for performing the method for calibrating an installation error in a pitch angle of a traffic radar of claim 1 when the computer program is executed by a processor.

10. An apparatus for calibrating an installation error in a pitch angle of a traffic radar, comprising:

at least one processor; and a memory communicatively connected to the at least one processor;

wherein the memory stores instructions executable by the at least one processor to cause the at least one processor to perform a method for calibrating an installation error in a pitch angle of a traffic radar, wherein the method comprises:

changing frequency of the traffic radar according to a preset strategy within a preset frequency range;

acquiring energy values of echo signals of a preset target at different frequencies in sequence; and in response to determining that the acquired energy values of the echo signals satisfy a preset condition, determining frequency corresponding to a maximum energy value of the echo signals as operating frequency of the traffic radar to calibrate the installation error in the pitch angle of the traffic radar;

wherein the preset target is disposed on the ground, and in a horizontal direction of the ground, a distance between the preset target and a projection point of the traffic radar in the horizontal direction is a length of a projection of a central beam of the traffic radar in the horizontal direction when the traffic radar is mounted at an expected pitch angle;

wherein the preset frequency range is determined according to a preset maximum calibration angle and a preset minimum calibration angle of the traffic radar;

wherein determining the preset frequency range according to the preset maximum calibration angle and the preset minimum calibration angle of the traffic radar comprises:

determining a first wavelength when the preset maximum calibration angle is calculated according to a preset equation and determining a first frequency value according to the first wavelength; and determining a second wavelength when the preset minimum calibration angle is calculated according to the preset equation and determining a second frequency value according to the second wavelength;

wherein the preset frequency range is a range from the first frequency value to the second frequency value, and the preset frequency range comprises the first frequency value and the second frequency value;

the preset equation is as follows:

$$\theta = \arcsin\left(\frac{\lambda}{\lambda_g} - \frac{\lambda}{L_f + L_P}\right),$$

wherein $\theta$ denotes the preset maximum calibration angle or the preset minimum calibration angle, $L_f + L_p$ denotes a distance between oscillators of two adjacent radiating units of an antenna of the traffic radar, $L_f$ denotes a feed line length between the two adjacent radiating units of the antenna of the traffic radar, $L_p$ denotes a patch element length of a radiating unit of the antenna of the traffic radar, $\lambda$ denotes a wavelength of a millimeter wave of the traffic radar in air, and $\lambda_g$ denotes a wavelength of the millimeter wave of the traffic radar on a dielectric substrate.

11. The apparatus of claim 10, wherein the preset strategy comprises changing the frequency from small to large or from large to small by same or different preset step frequencies each time.

12. The apparatus of claim 10, wherein the expected pitch angle is determined according to an installation height and a preset detection range of the traffic radar.

13. The apparatus of claim 10, wherein the preset condition comprises the acquired energy values of the echo signals changing from small to large and then from large to small.

14. The apparatus of claim 10, wherein the traffic radar is mounted at a preset downtilt angle before the frequency of the traffic radar is changed, the preset downtilt angle not exceeds a designed maximum calibration angle.

\* \* \* \* \*